Feb. 4, 1958 D. F. ABRAMS 2,821,901
MEAT-CURING INJECTION MACHINE
Filed April 5, 1955 5 Sheets-Sheet 1
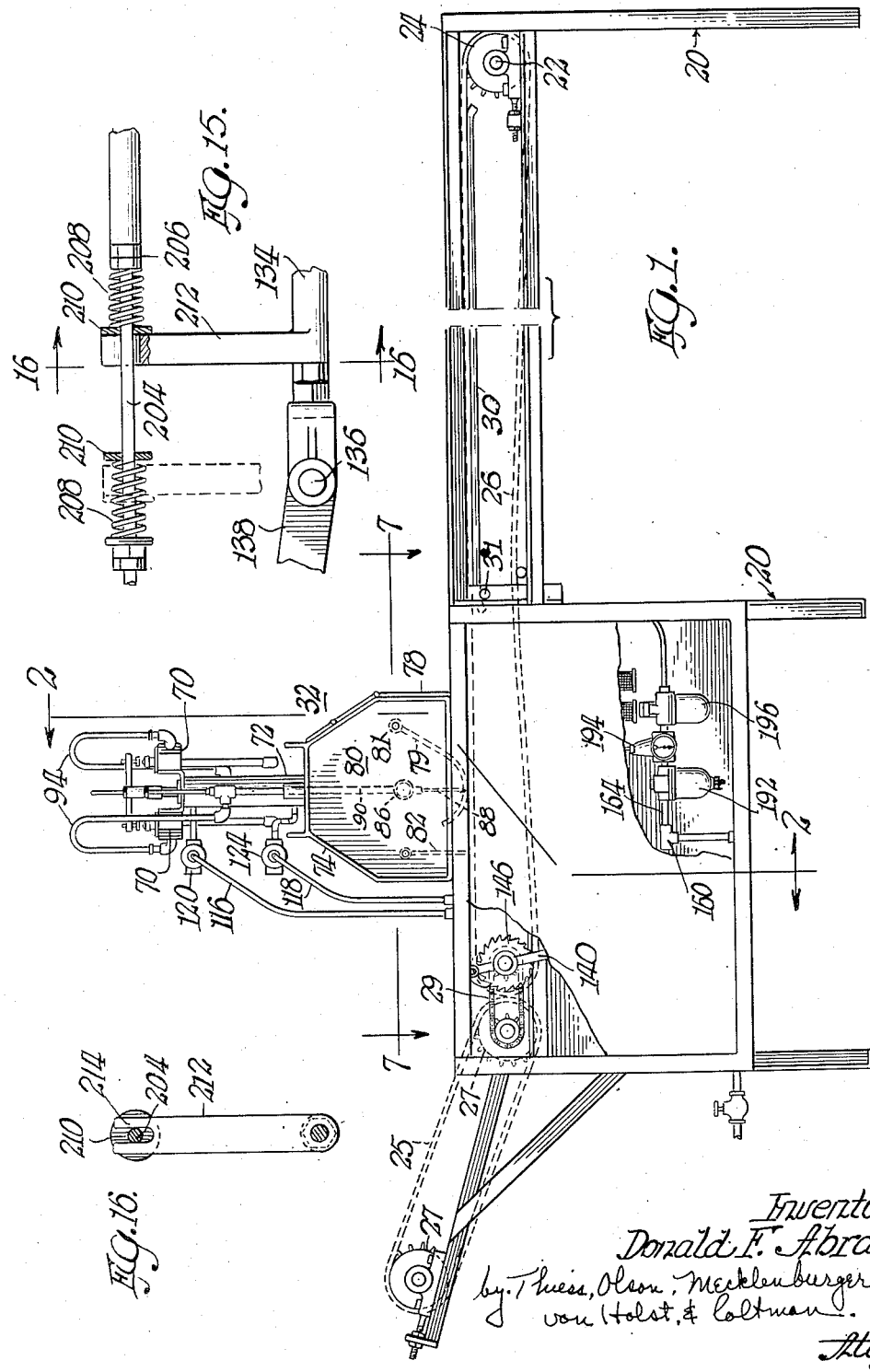

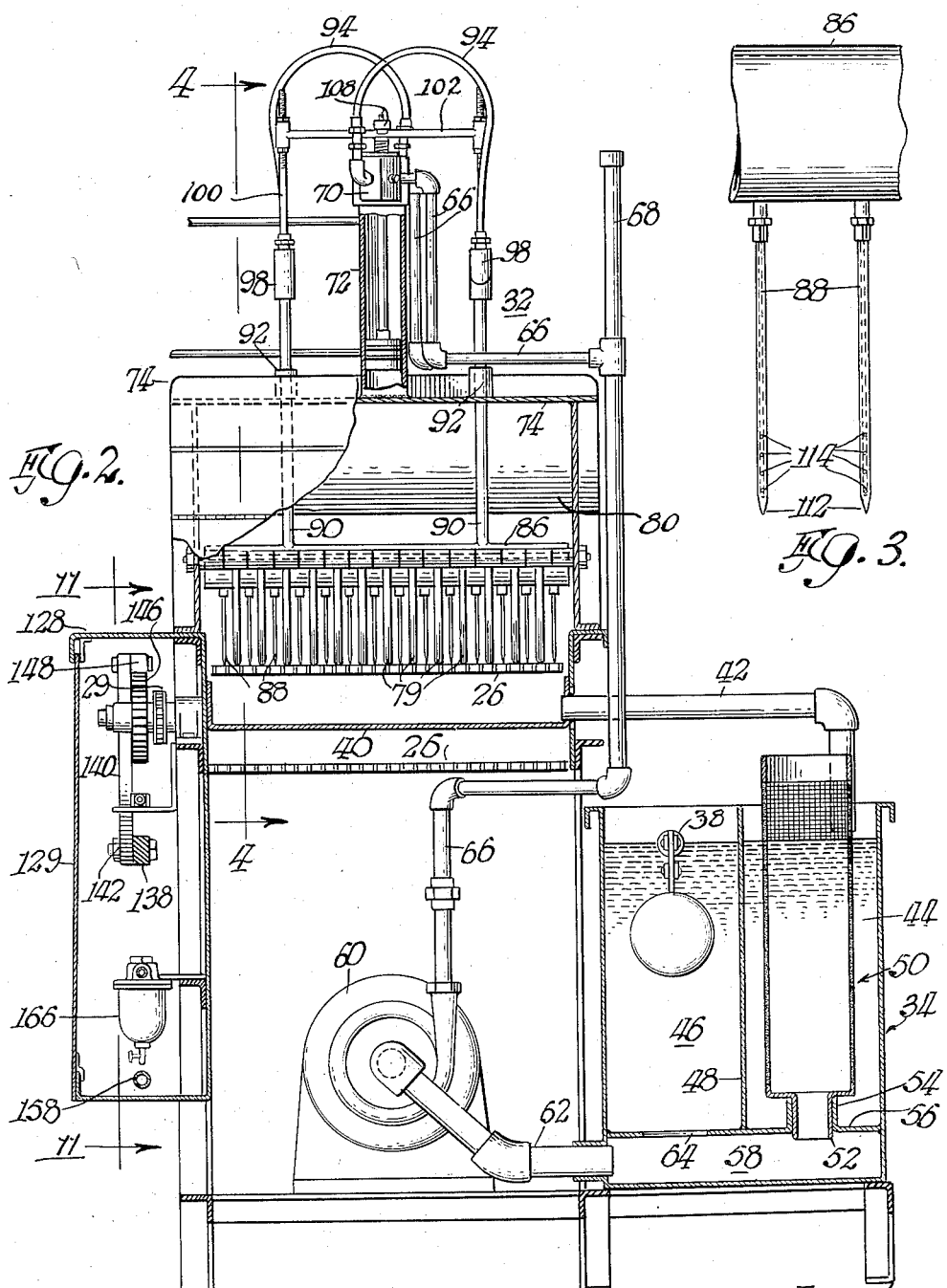

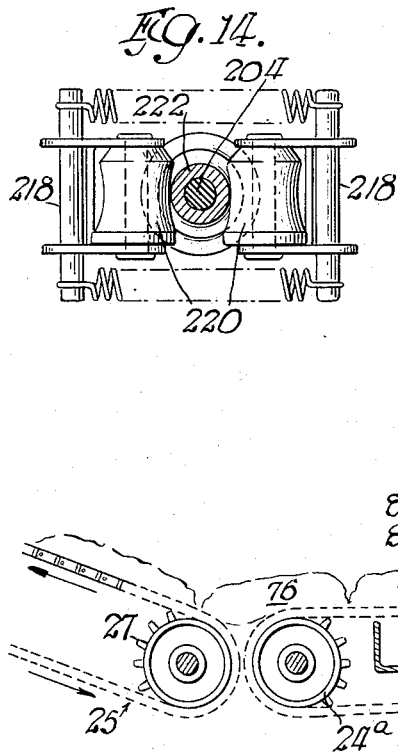
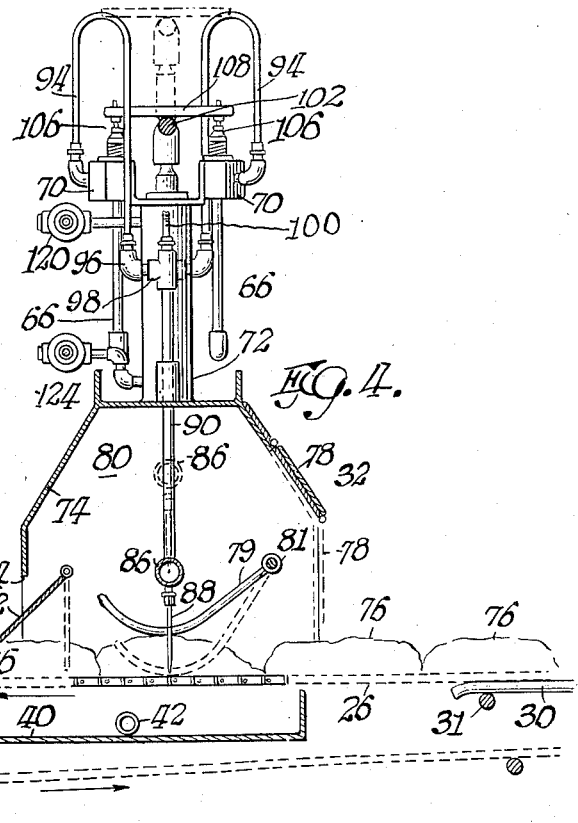
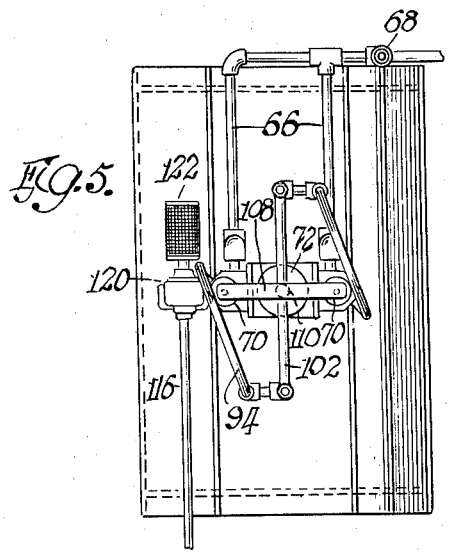
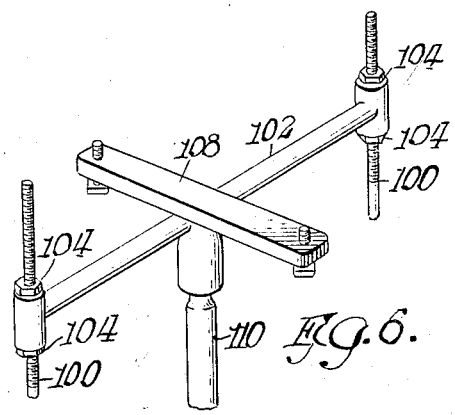

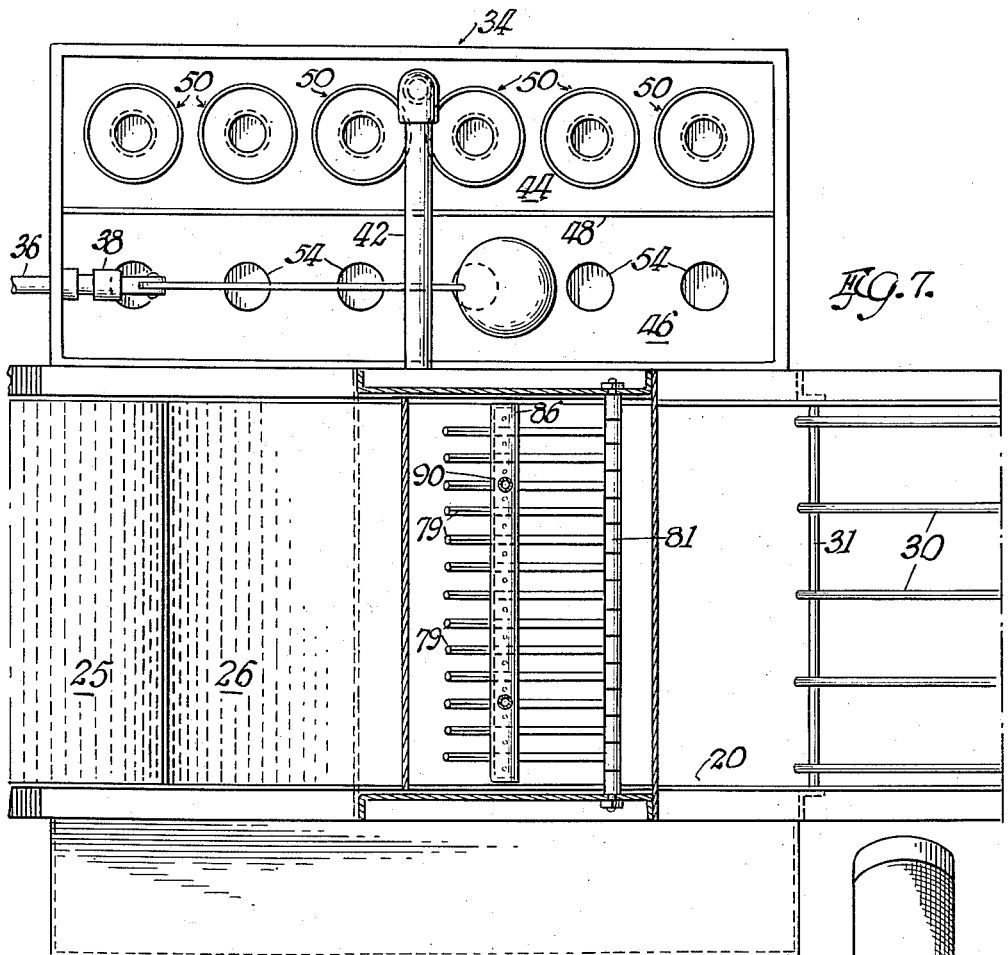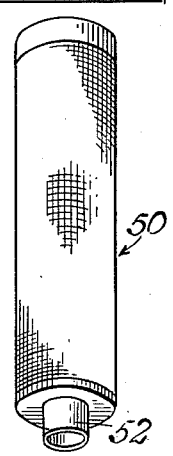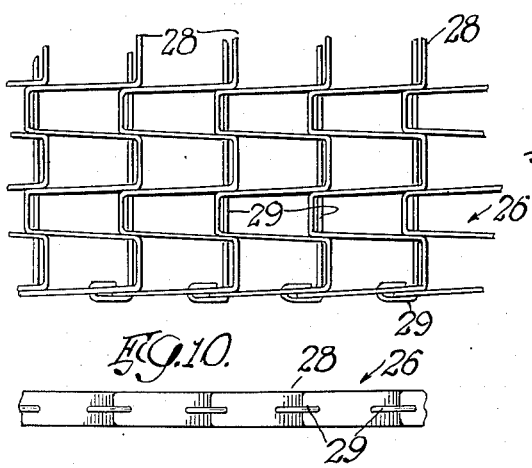

Feb. 4, 1958           D. F. ABRAMS           2,821,901
MEAT-CURING INJECTION MACHINE
Filed April 5, 1955           5 Sheets-Sheet 5
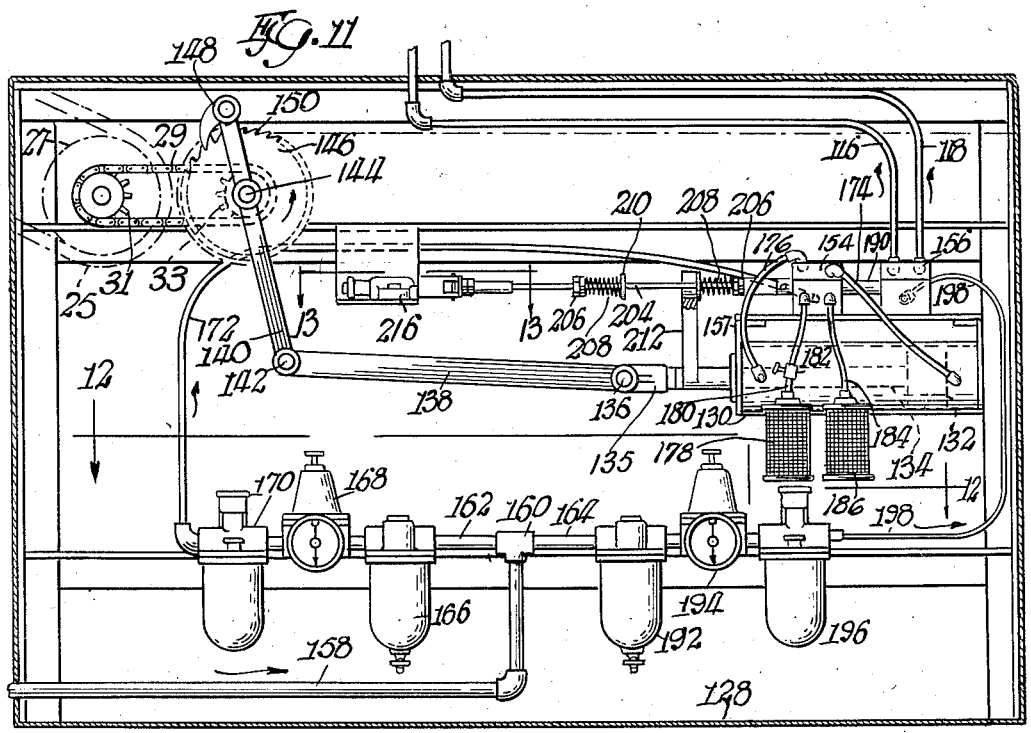
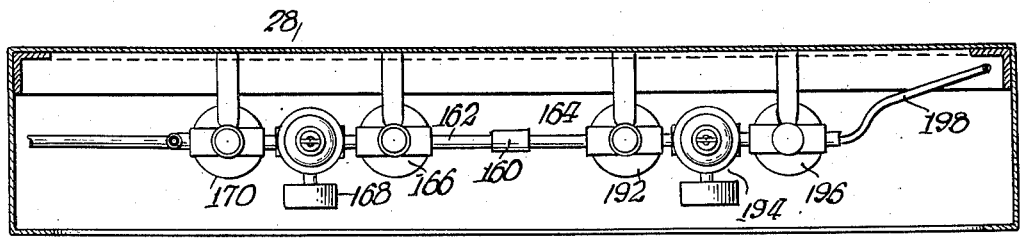
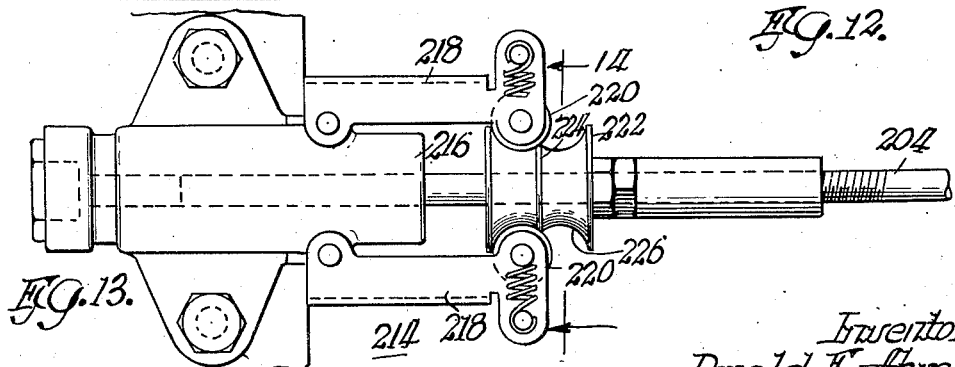

United States Patent Office 2,821,901
Patented Feb. 4, 1958

2,821,901

MEAT-CURING INJECTION MACHINE

Donald F. Abrams, Chicago, Ill., assignor to David Berg & Company, Chicago, Ill., a corporation of Illinois Application April 5, 1955, Serial No. 499,393

6 Claims. (Cl. 99—257)

The present invention relates to an apparatus for injecting fluids into readily penetrable bodies, and, more particularly, pertains to an apparatus adapted to accelerate the curing of pickling of meats.

In the pickling of meat, it had previously been the practice, for instance in the production of corned beef, to soak the suitable cut of meat in a pickling or brine solution until it had been thoroughly cured. It is readily appreciated, under such practice, that the pickling time is of long duration if complete curing of the internal portions of the meat were to be assured, since the pickling solution had to slowly penetrate to the innermost tissues.

To accelerate the pickling time, a manually operable injection needle was devised which has a trigger-controlled head for injecting brine or other suitable solution into the inner tissues of the meat, the injected meat being then placed in a vat of brine for external curing, simultaneously effected with the internal curing effected by the brine injections.

However, in the course of operation of the manually operable injection needle, the depth to which the needle penetrates the meat tissues, the spacing of the penetrations, and the volume of each injection is dependent upon the action and skill of the operator; and, therefore, uniformity of final product cannot be assured.

It is an object, therefore, of the present invention to provide an automatic apparatus adapted to uniformly inject pickling solution into meat, whereby the time in which a meat product is pickled is greatly accelerated.

It is another object of this invention to provide an apparatus which assures pickling uniformity in the final meat product.

It is a further object of this invention to provide an apparatus which requires no human agency in the course of the pickling operation, whereby the sanitary condition of the final product is enhanced.

It is a still further object of the present invention to provide an injection apparatus employing a novel pneumatic circuit assuring efficiency of operation.

It is another object of the present invention to provide an apparatus utilizing a novel injection means and housing which limits loss of the injected fluid to a minimum.

The above and other objects of this invention will become more apparent from the description, accompanying drawings, and appended claims.

In carrying out the invention in one form, a frame member is provided upon which is mounted, by means of crossshafts, an endless foraminous belt which is adapted to deliver the meat to be processed to the injection apparatus and thence onto a second similar belt which deposits the injected meat in a vat containing brine. The belt is intermittently driven in predetermined increments, and the meat cuts are injected during the intervals in which the belt remains stationary. At one side of the apparatus is the motive means which drives the endless belt by means of a pawl and ratchet mechanism. The pneumatic valves which regulate the rapidity of the foraminous belt travel and the injection means reciprocal movement are positioned at the same side adjacent the motive means. At the oppositely disposed side of the apparatus is positioned a pickling-brine supply tank supplied by a conduit which is controlled by a float valve. The tank contains filtering screens for removing meat particles returning to the supply tank in the brine "overage" from the injecting area by means of a return piping system.

Surmounting one end portion of the endless conveyor belt is a housing in which is positioned the injection means. The latter means comprises a manifold having a plurality of depending apertured hollow needles disposed transverse to the travel of the conveyor on which the meat is positioned. The manifold is supported by hollow conduit arms which are, in turn, supported by a crosshead attached to a reciprocally movable piston arm. The arms reciprocally move the manifold and also supply the brine solution, which is pumped from the aforementioned tank under pressure. Interposed in the conduits between the high pressure brine source and the injection means are two-way spring-loaded valves which are adapted to be opened by means of a second crosshead affixed to the reciprocally movable piston arm when said injection means is in the lowered, or meat penetrating, position. When the meat injection means is in the raised position, the spring-loaded valves cut off the supply of brine to the manifold and the conveyor belt advances the meat a predetermined increment preliminarily to a repeat injecting operation on a following meat product. The meat is then transferred from the first belt to a second conveyor belt which deposits the meat in a brine-containing vat.

For a more complete understanding of the subject invention, reference will now be made to the accompanying drawings, wherein:

Figure 1 is a view in side elevation of a meat-pickling or curing machine, embodying the preferred form of the invention;

Fig. 2 is a transverse, vertical sectional view through the machine taken on line 2—2 of Figure 1 and on a scale enlarged thereover;

Fig. 3 is a view in elevation of a fragment of the needle manifold and two of the fluid-injection needles carried thereby, on a scale enlarged over that of Fig. 2;

Fig. 4 is a longitudinal, vertical sectional view through a part of the machine taken on the line 4—4 and on substantially the scale of Fig. 3;

Fig. 5 is a top plan view of the housing appearing in Fig. 4 wherein the meat injections are carried out, and which will be more fully discussed hereinafter;

Fig. 6 is a detailed perspective view of a crosshead mechanism included in the apparatus appearing in Figs. 4 and 5;

Fig. 7 is a horizontal view through a part of the machine taken on the line 7—7 of Figure 1 and on a scale enlarged thereover;

Fig. 8 is a perspective view of one of the screens appearing in Figs. 2 and 7, and will be more fully described hereinafter;

Fig. 9 is a plan view of an enlarged fragment of the main and secondary endless belts employed in the apparatus;

Fig. 10 is a side view of the chain fragment illustrated in Fig. 9;

Fig. 11 is a partial, sectional view taken on the line 11—11 of Fig. 2 but on a larger scale;

Fig. 12 is a horizontal, sectional view taken on the line 12—12 of Fig. 11;

Fig. 13 is a horizontal, sectional view taken on the line 13—13 of Fig. 11 but on a larger scale;

Fig. 14 is a detailed sectional view taken on the line 14—14 of Fig. 13;

Fig. 15 is a detailed view, partly in section, of certain of the parts of the apparatus appearing in Fig. 11 and on a scale enlarged thereover; and Fig. 16 is a detailed vertical, sectional view as taken on the line 16—16 of Fig. 15.

Conveyor belt

Referring now to the drawings and, more particularly to Figure 1, 20 designates a frame supporting transverse rods 22 on which are journalled sprocket wheels 24, which, in turn, engage an endless conveyor belt 26, an enlarged fragment of which appears in Fig. 9. As will be noted from Figs. 9 and 10, the conveyor belt 26 is composed of a plurality of transverse metal strips 28 bent into a predetermined configuration and maintained in flexible interlocking relationship by means of intersecting rods 29. The conveyor 26 is adapted to slidably engage longitudinal support bars 30 carried on transverse rods 31, positioned in the frame 20 as illustrated in Fig. 7, in the course of delivering cuts of meat, which are to be cured, to an injection housing 32. The housing 32 will hereinafter be described in greater detail. In the normal course of moving the conveyor belt 26, the teeth of the sprocket wheels 24 engage the outermost rows of the interlocking strips 28 and transverse rods 29 and impart longitudinal movement thereto.

Injection fluid supply

As will be more clearly seen in Fig. 2, disposed at one side of the illustrated apparatus is a brine storage tank 34. It is, of course, obvious that the fluid composition of the liquid to be injected in the meat may vary, and, more commonly, the fluid comprises a brine solution containing spices. The brine tank 34 is connected, by means of a conduit 36 depicted in Fig. 7, to a pickling-brine supply (not shown). A float valve 38 regulates the admission of pickling brine from the supply source and maintains the brine supply in the tank 34 at a predetermined level. It will also be noted from Figs. 2 and 7 that brine "overage" not injected into the meat passing through the injection station is collected in a drip pan 40 and returned by gravity through a conduit 42 to a brine tank chamber 44. The latter chamber is separated from a brine tank chamber 46 which receives the brine from the supply source, by means of partition 48.

A plurality of cylindrical screen members 50, one of which is illustrated in perspective in Fig. 8, are positioned in the brine tank chamber 44 and serve as a filtering medium for removing meat particles returned to the brine tank from the drip pan 40. The screen members 50 have reduced neck portions 52 which are inserted in conical projections 54 formed integral with a false bottom 56 of the brine tank. An interconnecting chamber 58 enables the filtered "overage" brine solution and the brine solution in the tank compartment 46 to mix and enter a pump 60, illustrated in Fig. 2, by means of an interconnecting conduit 62.

It is thus seen that the brine tank 34 utilizes "overage" brine from the drip pan 40 and also fresh brine from a supply source entering the tank compartment 46. The latter brine emerges from the compartment 46 into the chamber 58, through an aperture 64 in the course of being drawn into the fluid pump 60.

The brine solution is pumped under high pressure through a conduit 66 having an air cushion 68 to reduce hammer, and thence into valve members 70, which are operable in the illustrated apparatus by piston and cylinder unit 72, as will hereinafter be described in greater detail.

Injection station

As will be noted in Figures 1, 2, and 4, the injection station 32 comprises a housing 74 positioned transverse to the continuous conveyor belt 26 upon which is carried meat cuts 76, which are to be processed by means of fluid injection in an injection chamber 80.

As is more clearly seen in Figures 1 and 4, the housing 74 supports a swingable door 78, which is in the lowered position illustrated in Figure 1, when not in use, and which is in the raised position illustrated in Fig. 4 when the apparatus is in the normal course of operation.

Also positioned in the injection chamber 80 of the housing 74 is a swingable spray-retaining panel 82, which in the normal course of operation, depicted in Fig. 4, abuts the top surface of the treated meat emerging from the chamber 80, thus preventing the escape of any spraying brine emerging from the injection apparatus, hereinafter to be described in greater detail.

As is more clearly seen in Fig. 2, the injection apparatus comprises a manifold 86 positioned transverse to the continuous conveyor belt 26. The manifold has depending therefrom a plurality of aligned hollow needles 88 normally disposed to belt 26 and meat cuts 76 carried thereby. The manifold member 86 is supported by two hollow tubular members 90 which slidably engage bearings 92, formed integral with the injection housing 74. As may be seen in Fig. 4, each of the tubular members 90 communicates with a flexible pressure hose 94 by means of an interconnecting elbow 96 and a T 98.

Suitably affixed to an aperture in each T 98 is a rod member 100. Each of the rod members 100 is affixed to a crosshead 102, clearly illustrated in Fig. 6, by means of lock nuts 104 or other suitable means. The rods 100 join supporting arms 90 to crosshead 102 and enable the arms and the attached manifold 86 and needles 88 to be reciprocally moved when crosshead 102 is reciprocally moved.

The brine-pickling solution which enters the valves 70 exits therefrom into pressure hoses 94 and through the elbows 96, T's 98 and through the hollow tubular members 90, and thence into the manifold 86 when the valves 70 are in the open position. As will be noted in Fig. 4, each of the valves 70 has a closure member 106 which is actuated by crossarm 108 disposed transverse to crossarm 102, as depicted in Fig. 6. Both of the crossarms are affixed to an extension rod 110 of the piston and cylinder unit 72 centered above the injection chamber housing 74.

Piston and cylinder unit 72 simultaneously reciprocates the injection manifold 86 and depending needles 88, and opens the valves 70 by depressing valve closure members 106 by means of crossarm 108. Thus, in the normal course of operation, when the injection needles are in the lowered or meat-injecting position, crossarm 108 is concomitantly lowered, opening the valves 70 allowing brine solution to flow therefrom, through pressure hoses 94, through the tubular arms 90, and thence to the manifold and out the injection needles 88.

Positioned in the housing chamber 80 are a plurality of arcuate hold-down bars 79 journalled on a transverse rod 81 which is, in turn, journalled in opposed walls of the housing 74. It is the function of the hold-down bars 79 to prevent the upward movement of the meat cuts 76, following the injection step, with needles 88 which are firmly imbedded in the cuts 76. The holddown bars exert sufficient downward pressure so as to enable the meat to remain in contact with the conveyor belt 26 as the injection needles 88 are upwardly withdrawn.

As will be noted from Fig. 3, each of the needles 88 has a pointed end limit 112 to facilitate penetration of the underlying meat cut 76. The lower end portion of each needle 88 is suitably apertured as at 114 to allow the brine-pickling solution to emerge from the needles under pressure.

As has previously been mentioned, brine solution not injected into the meat 76 may spray outwardly, abut against the walls of the housing 74, and flow down through the foraminous conveyor 26 into the underlying pan 40 from which it will be returned to chamber 44 of the brine tank 34 by means of the conduit 42, such an occurrence taking place if the needles 88 project into a void between two adjacent meat cuts 76.

Referring to Figure 1, it will be noted that piston extension rod 110 is reciprocally moved by means of the air entering the unit 72 through conduits 116 and 118. In the course of upward movement of the rod 110, air enters the unit 72 through quick-opening valve 124 by means of conduit 118. The air positioned above the piston member which must be exhausted in the cylinder chamber exits through a quick-opening valve 120, clearly shown in Fig. 5, which has a muffler 122 attached thereto whereby the air may escape to the atmosphere with a minimum of noise.

Conversely, during the down stroke of rod 110 (in the course of which valves 70 are open and the injection needles 88 are lowered) air under pressure enters valve 120 by means of conduit 116, and the air trapped below the piston in unit 72 is allowed to escape through quick-opening valve 124, which also has a muffler (not shown) attached thereto, for the escape of air to the atmosphere.

Conveyor belt motive means

Referring now, more particularly, to Fig. 11, the motive means for intermittently moving a conveyor belt 26 is depicted. The motive means simultaneously actuates the regulating valve governing the flow of air to the belt moving means and to the piston and cylinder unit 72, which reciprocally moves the injection manifold 86 and depending needles 88.

The apparatus illustrated in Fig. 11 is housed in a rectangular housing 128 having a removable door 129, as shown in Fig. 2. The belt motive means comprises a horizontal piston and cylinder unit 130 in which a reciprocally movable piston 132 and an attached piston arm 134 are housed. The piston arm 134 has a bifurcated end limit 135 which is pivotally connected at 136 to a pitman 138 which, in turn, pivotally engages an oscillating arm 140 by means of a pin 142. The arm 140 is journalled at 144 to a cross-shaft on which is mounted a ratchet wheel 146. Attached to the end limit of the operating arm 140 is a pawl 148, which engages teeth 150 of the ratchet wheel 146, in the course of a counterclockwise pivotal movement of the pawl-engaging end limit of the oscillating arm 140.

It is thus seen that, in the course of the reciprocal movement of the piston 132, the arm 140 is pivoted about cross-shaft 144. In the course of the clockwise movement of the pawl 148 (when piston arm 134 is in the course of effecting a stroke to the left in the apparatus illustrated in Fig. 11), the pawl slides over the teeth 150. However, in the course of a counter-clockwise movement of the pawl 148, one of the ratchets 150 is engaged and the wheel 146 turned counterclockwise a predetermined angle of rotation, which angular movement will be translated by the endless conveyor belt 26 into longitudinal movement. It is thus seen that the piston member 132 advances the endless conveyor belt 26 in intermittent predetermined increments in the course of the reciprocation in cylinder 130. It is apparent that the stroke of the piston 134 may be easily regulated. The stroke determines the magnitude of the travel of the conveyor 26 and, thus, the interval at which the meat cuts are injected.

Regulating valves for piston and cylinder units

Mounted on cylinder 130 are bracket members 157 which support double-acting valves 154 and 156. Valve 154 regulates the admission and ejection of air to cylinder 130; double-acting valve 156 regulates the admission and ejection of air to cylinder 72 mounted on the injection chamber 74.

In the normal course of operation of the cylinder 130, air under pressure flows through a conduit member 158 and thence into a T member 160, at which point the air is divided along two separate paths into conduits 162 and 164. The high pressure air delivered along conduit 162 passes through air filter 166, which removes foreign particles, and thence through pressure regulator 168. The latter regulator is set at a predetermined pressure so as to assure a constant air pressure in cylinder 130, which is in fluid communication therewith. Air oiler 170 enables vaporized oil to mix with the passing air. The entrained oil acts as a lubricant upon entering the cylinder 130 in which piston 132 is reciprocally movable.

The air emerging from the air oiler 170 flows through a conduit 172 and into the double acting valve 154. When valve 154 is in fluid communication therewith, air flows through an interconnecting conduit 174, into the cylinder 130, forcing the piston rod 134 to move outwardly from the cylinder 130. Simultaneously, air which is to be ejected from the cylinder 130 escapes therefrom by means of a conduit 176 which leads to the double-acting valve 154 from which the air escapes through muffler 178 by means of an interconnecting conduit 180.

Positioned on the interconnecting conduit 180 is a needle valve 182 which regulates the speed at which air may escape from the cylinder 130, and thereby regulates the reciprocal movement of the piston 132 and, thus, the speed of the intermittent movements of the endless belt conveyor 26.

Upon the occurrence of a retraction stroke of piston 132 in cylinder 130, fluid pressure enters through conduit 176 from valve 154 and air escapes from cylinder 130 by means of conduit 174. The latter conduit leads back to valve 154 from which it passes through conduit 184, to a muffler 186 and thence into the atmosphere.

It should be noted that closure member 190 of valve 154 simultaneously functions as the closure member for double-acting valve 156 which regulates the reciprocal movement of the piston and cylinder unit 72, which unit reciprocally moves injection needles 88.

Referring to Fig. 11, it will be seen that the high pressure air, entering through conduit 158 and diverted at 160 into the pipe 164, passes through air filter 192, pressure regulator 194 and air oiler 196 preliminarily to entering the valve 156 through a conduit 198. From the conduit 198, high pressure air enters valve 156 and thence either conduit 116 or 118.

High pressure air is admitted to conduit 116 during the down stroke of the piston housed in cylinder 72 and the down stroke of the injection needles 88. During the down stroke, the air trapped in the cylinder escapes through quick-opening valve 124 and an adjacent muffler (not shown). Similarly, upon the up stroke of the piston in unit 72, high pressure air passes through conduit 118 and valve 124, and the trapped air in the cylinder escapes through quick-opening valve 120 and muffler 122 (see Fig. 5).

It will be appreciated from Fig. 11 that the reciprocal travel of piston 132 in cylinder 130 is of greater magnitude than the simultaneous reciprocal movement of the closure member 190, which is common to each of the double-acting valves 154 and 156. To provide for lost motion between piston arm 134 and closure member 190, an extension rod 204 is fixedly attached to the end portion of the closure member 190 by suitable means. Fixedly positioned on the extension arm 204 are nut members 206 which abut spring members 208, affixed to collars 210.

Fixedly attached or formed integral with the piston arm 134 of piston 132 is a vertically extending arm 212 having a bifurcated end limit 214, more clearly shown in Fig. 16. Referring to Fig. 15, it will be seen that, as piston arm 134 reciprocates, arm 212 abuts and alternately axially moves the two collar members 210 at the end limit of its strokes. The common closure member 190 for valves 154 and 156 is, therefore, moved only at the end limit of the reciprocal movement of the piston arm 134 when collars 210 are abutted and springs 208 compressed. The extension arm 204 and attached closure member 190 are then moved the desired axial length which corresponds to the proper open and close positions in the two valves 154 and 156. It is thus apparent that valves 154 and 156 act in unison. The injection needles 88 are in the lowermost position as piston member 132 in cylinder 130 is moving outwardly, at which time the continuous conveyor belt 26 remains motionless.

During the retraction stroke of piston 132 (stroke to the right in Fig. 11), the conveyor 26 is moved a predetermined increment by means of the ratchet wheel 146. Air, simultaneously, is admitted to valve 156 and passed through conduit 118 and through valve 124 whereby the piston in cylinder unit 72 is enabled to move upwardly, retracting the injection needles 88.

To enable closure member 190 to be moved an added increment, a spring-loaded clamp device 214 is provided which comprises an apertured housing 216 having pivotally mounted thereon arms 218 which have at their end portions spring-loaded roller members 220. Fixedly positioned on the extension rod 204, which is connected to closure member 190, is a double-channeled cam 222. Upon being moved normal to the clamp 214, the extension arm 204 moves cam 222 until a center portion 224 of the cam is just beyond the center line of the opposed roller members 220, affixed to the end portions of the arms 218. As will be noted from Fig. 14, the opposed spring-loaded rollers 220 rotatably engage the double-channeled cam 222. Upon the center line 224 of the cam moving past the center line of the opposed rollers 220, the rollers 220 engage a second channel portion 226, forcing extension arm 204 and attached closure member 190 to move slightly to the left, as illustrated in Fig. 11. The added axial movement effected by clamp device 214 prevents the closure member 190 from attaining a locked neutral position, whereby fluid pressure is neither able to enter nor escape from either of the double-acting valves 154 and 156.

Resume of operation

It is thus seen that an automatic apparatus has been provided which accelerates and facilitates the pickling of meat products. In the normal course of operation, the continuous belt 26 rotatably engaging the sprockets 24 advances in predetermined increments in the direction of the injection chamber 80. One of the sprocket wheels, 24a, is journalled on the same shaft 144 that ratchet wheel 146 is journalled (see Fig. 11 and Fig. 4). Consequently, sprocket wheel 24a will arcuately move an identical angle of rotation with the arcuate movement of sprocket wheel 146, which is driven by horizontal piston member 142. As the meat cuts 76, positioned on the continuous belt 26 remain motionless during the outward stroke of piston 132, the injection needles 88 are lowered by the piston and cylinder unit 72 at which time valves 70 are opened by means of crosshead 108 which depresses closure members 106 to the open position. Pickling brine under pressure being pumped through conduit 66 into valve 70 is then allowed to flow out of the valve 70 through pressure hoses 94 into the manifold 86, which maintains the injection needles 88 in a vertically aligned position transverse to the movement of the meat 76. As the conveyor belt and the meat remain motionless, the pickling brine solution is injected into the meat. Following the injection, piston and cylinder unit 72 upwardly retracts the injection needles 88 as the hold-down arm 79 prevents the meat cuts 76 from also withdrawing upwardly.

As the injection needles are withdrawn upwardly, piston arm 134 of the horizontal unit 130 is retracted by virtue of the simultaneous admission of high pressure air into cylinder 130, through conduit 176 and the admission of air into cylinder 72, through conduit 118, which simultaneous action is effected by the movement of the common closure member 190. The injected meat cuts 76, passing out of the injection chamber 80, are deposited on an adjacent continuous conveyor 25, which is moved by means of sprocket wheel 27, which wheel is adapted to move with the sprocket wheel 24a of belt 26 by means of an interconnecting chain belt 29, which engages auxiliary sprocket wheels 21 and 23. Sprocket wheels 21 and 23 are journalled on the same shafts that belt-driving sprocket wheels 27 and 24a, respectively, are journalled (see Fig. 11). The meat cuts are dropped from the end of conveyor belt 25 into a pickling brine solution until a predetermined time for complete pickling of the meat cut has expired.

Although the illustrated apparatus is pneumatically operated, electrical motivating means may be utilized. However, the absence of electricity in the illustrated device precludes the danger of short circuiting, which is present where fluids and moisture are in the vicinity of electrical machinery and wiring, thereby enhancing the safety of operation.

While a particular embodiment of the machine is illustrated, it will be understood, of course, that the invention is not to be limited thereto, since modifications may be made and equivalent structural components substituted for those depicted.

I claim:

1. In an apparatus for injecting fluids into meat and the like, the combination comprising reciprocally movable injection means, a conveyor belt intermittently movable in predetermined increments transverse to said injection means, motive means positioned adjacent said injection means moving said conveyor belt, an injection fluid supply tank positioned adjacent said injection means, a fluid-operable piston and cylinder unit surmounted over said injection means, conduit means interposed between said supply tank and said injection means, valve means interposed in said conduit means, and two transversely disposed crossheads affixed to the upper end limit of the arm of said piston, one of said crossheads actuating the closure members of said valve means interposed in said conduit means, the other of said crossheads being in supporting relationship with said injection means, said motive means for said conveyor belt simultaneously moving said conveyor belt and governing the flow of fluid operating said piston and cylinder unit, whereby said piston and cylinder unit may reciprocally move said injection means and simultaneously regulate the flow of injection fluid to said injection means when said conveyor belt is at predetermined conditions of rest or movement.

2. In an apparatus for injecting fluids into meat and the like, the combination comprising reciprocally movable injection means, a first motive means reciprocally moving said injection means and concomitantly regulating the flow of injection fluid to said injection means, a first valve means regulating said first motive means, an endless conveyor movable in a plane substantially transverse to said injection means, a second motive means intermittently advancing said conveyor in predetermined increments, a second valve means regulating said second motive means, a common closure member for said first and said second valve means whereby said valves may be operable concurrently, an extension arm fixedly attached to said common closure member having two collar members fixedly positioned thereon, and a linking arm fixedly attached to a portion of said second motive means, said linking arm having a bifurcated end limit, said bifurcated end limit being slidably engageable with said extension arm between said two fixed collar members and abuttingly engageable with said collar members whereby said common closure member may be reciprocally moved into open and close positions.

3. In an apparatus for injecting fluids into meat and the like, the combination comprising movable injection means, a meat support positioned in proximity to said injection means, motive means moving said injection means, a supply source of injection fluid in communication with said injection means, conduit means connecting said supply source and said injection means, valve means interposed in said conduit means, said valve means being operable by said motive means during the movement of said injection means, a second motive means moving said meat support, a first two-way valve member regulating said first motive means, a second two-way valve member regulating said second motive means, a closure member common to each of said two-way valves, and an extension arm movable by said second motive means reciprocally moving said common closure member.

4. In an apparatus for injecting fluids into meat and the like, the combination comprising fluid actuated reciprocally movable injection means movable in a vertical plane, conveyor means intermittently movable in predetermined increments transversely to said injection means, oscillating means for moving said conveyor means in predetermined increments, a fluid operable reciprocating piston and cylinder unit actuating said oscillating means, double-acting valve means regulating the introduction of fluid into said cylinder unit and the exhaustion of fluid therefrom, a second double-acting valve means for controlling the flow of actuating fluid for said reciprocally movable injection means, the closure members for said first and second double-acting valve means comprising an integral member whereby said reciprocally movable injection means must be at predetermined positions in the vertical plane during said conveyor intermittent periods of movement and rest.

5. In an apparatus for injecting fluids into meat and the like, the combination comprising fluid actuated reciprocally movable injection means movable in a vertical plane, an injection fluid supply source in communication with said injection means, fixedly positioned valve means having closure members reciprocally movable in a vertical plane for regulating the flow of injection fluid into said injection means, actuating means for opening said valve means reciprocally movable with said injection means, conveyor means intermittently movable in predetermined increments transversely to said injection means, oscillating means for moving said conveyor means in predetermined increments, a fluid operable reciprocating piston and cylinder unit actuating said oscillating means, double-acting valve means regulating the introduction of fluid into said cylinder unit and the exhaustion of fluid therefrom, a second double-acting valve means for controlling the flow of actuating fluid for said reciprocally movable injection means, the closure members for said first and second double-acting valve means comprising an integral member, said closure members for said first and second double-acting valves and the closure members for said fixedly positioned valve means being adjusted so that injection fluid will flow into said injection means when said latter means are at the lower end limit of its reciprocal movement, and said conveyor is at rest.

6. In an apparatus for injecting fluids into meat and the like, the combination comprising reciprocally movable injection means movable in a vertical plane, a first fluid operated piston and cylinder unit for reciprocally moving said injection means, quick opening valve means disposed at opposed ends of said cylinder unit whereby the actuating fluid may rapidly enter and leave said cylinder, conveyor means intermittently movable in predetermined increments transversely to said injection means, oscillating means for moving said conveyor means in predetermined increments, a second fluid operable reciprocating piston and cylinder unit actuating said oscillating means, double-acting valve means regulating the introduction of fluid into said cylinder unit and the exhaustion of fluid therefrom, a second double-acting valve means for controlling the flow of actuating fluid into said first fluid operated piston and cylinder unit quick opening valves, the closure members for said first and second double-acting valve means comprising an integral member whereby said reciprocally movable injection means must be at predetermined positions in the vertical plane during said conveyor intermittent periods of movement and rest.

References Cited in the file of this patent
UNITED STATES PATENTS

| | | |
|---|---|---|
| 2,587,024 | Avery | Feb. 26, 1952 |
| 2,645,172 | Allbright et al. | July 14, 1953 |
| 2,699,717 | Moreland et al. | Jan. 18, 1955 |